United States Patent [19]
Mayer

[11] Patent Number: 5,369,455
[45] Date of Patent: Nov. 29, 1994

[54] APPARATUS FOR CAMERAS PERMITTING THE TAKING OF IN SITU PICTURES IN WATER

[76] Inventor: Claus Mayer, Beekloh 18a, 2075 Ammersbek 1, Germany

[21] Appl. No.: 989,072

[22] Filed: Dec. 11, 1992

[30] Foreign Application Priority Data

Dec. 20, 1991 [DE] Germany .................. 4142223

[51] Int. Cl.⁵ .................................. G03B 17/08
[52] U.S. Cl. .......................... 354/64; 354/288
[58] Field of Search .................... 354/64, 288

[56] References Cited

U.S. PATENT DOCUMENTS 3,596,582  8/1971  Sayer .................... 354/64
3,838,434  9/1974  Hughes et al. .......... 354/64

FOREIGN PATENT DOCUMENTS 1737670  5/1956  Germany .
1041349  5/1957  Germany .

Primary Examiner—Michael L. Gellner
Assistant Examiner—Jae N. Noh
Attorney, Agent, or Firm—Robert W. Becker & Associates

[57] ABSTRACT

An apparatus for cameras permitting the taking of in situ pictures in water. A housing has a first opening that is at least open to light relative to an object that is to be observed. A second opening is disposed essentially opposite to the first opening and serves for accommodating a camera. The housing has at least one inlet means for the supply of water.

19 Claims, 5 Drawing Sheets

5,369,455

APPARATUS FOR CAMERAS PERMITTING THE TAKING OF IN SITU PICTURES IN WATER

BACKGROUND OF THE INVENTION

The present invention relates to an apparatus for cameras permitting the taking of in situ pictures in water.

Due to a natural turbidity from sediments that are dissolved or suspended in water, as are encountered, for example, in flowing water that is affected by tides, but also due to many forms of contamination in lake, river and sea water, it is often possible only with extremely great effort and expense to make adequately sharp underwater photographs or motion pictures, for example of bulkheads, the bottoms of ships, wrecks, or other objects that are located under water. The great difficulty in getting sharp pictures is based essentially on the fact that the particles that are dissolved or suspended in the water make the water so dense that even if the camera is very close to the object that is to photographed, the pictures are so unclear that they are of little or no help in providing any real information about the conditions encountered in the water by the pertaining object. This very disadvantageous and unacceptable condition that is encountered when taking underwater pictures is equally applicable to photograph picture-taking as well as video recording.

As indicated above, it has been attempted to resolve the problem of taking in situ pictures in water by, for example, encasing in a very complicated and expensive manner the region about the object that is to be photographed and then pumping the water out of the casing and thereupon making the necessary photographs in a water-free environment within the casing. The expense of this method increases as the depth of the object that is to be observed in the water increases, and below a certain depth in the water this known method becomes increasingly unattractive due to the increase in pressure and the increasingly more difficult technical problems inherent thereto.

It is therefore an object of the present invention to provide an apparatus for cameras permitting the taking of in situ pictures in water, which apparatus can be easily attached to underwater cameras, but also to normal cameras that are adapted for the underwater arena, and with which accurate and sharp pictures of the object that is to be observed can be made, whereby the apparatus should have a straightforward construction and furthermore should be capable of being used at nearly any depth of water, with the apparatus also being easy and economical to produce and having both commercial as well as private applications.

BRIEF DESCRIPTION OF THE DRAWINGS

This object, and other objects and advantages of the present invention, will appear more clearly from the following specification in conjunction with the accompanying schematic drawings, in which:

FIG. 3b is a side view of the element of FIG. 3a;

SUMMARY OF THE INVENTION

Figure 1:
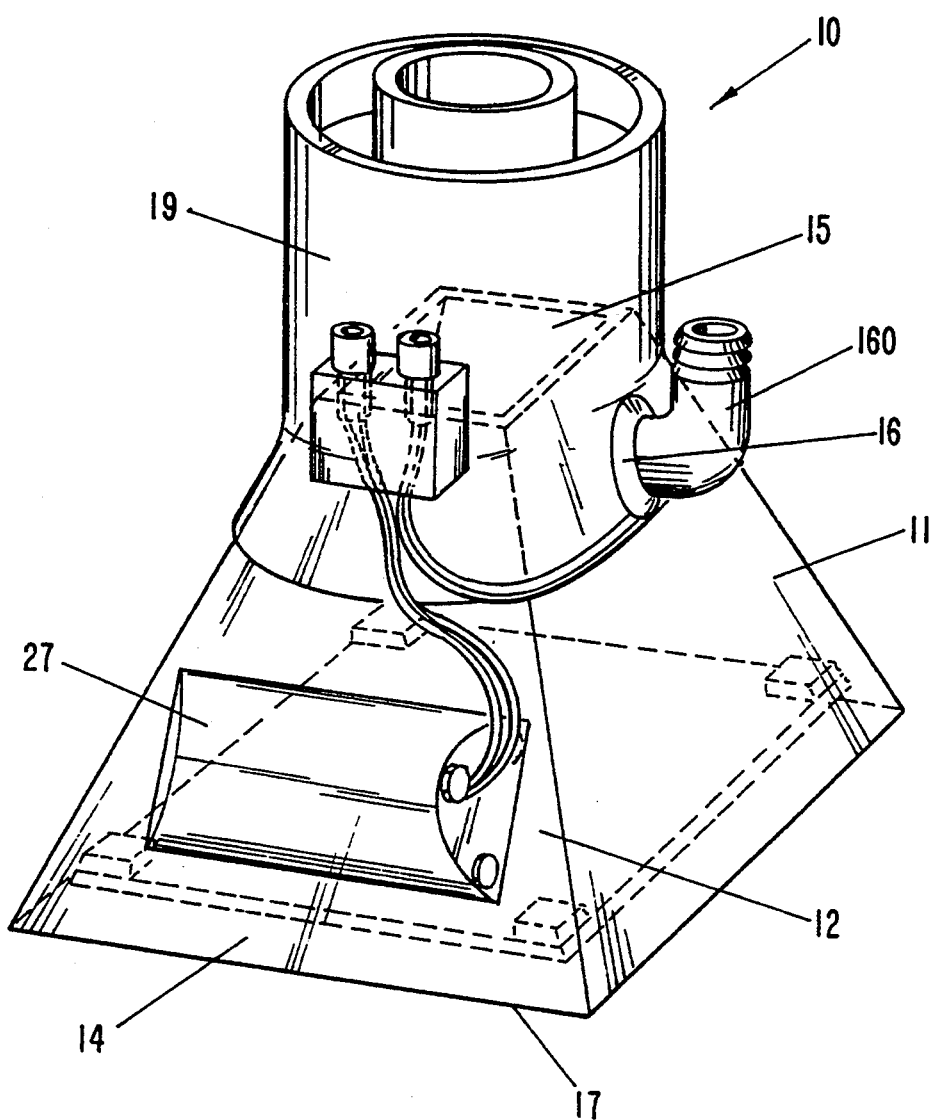
FIG. 1 is a perspective view of one exemplary embodiment of the inventive apparatus.

The apparatus of the present invention comprising a housing having a first opening that is at least open to light relative to an object that is to be observed, and a second opening that is disposed essentially opposite to the first opening and serves for accommodating a camera, with the housing also being provided with an inlet means for receiving water.

The essential advantage of the inventive apparatus is that while manipulation of the camera is in principle not changed, the housing merely has to be connected in a region of the camera lens and fresh water has to be introduced into the housing from an external source, for example via a separate hose to the surface of the water or from a fresh water supply, with the water being introduced into the interior of the housing so that the interior of the housing fills with clean water directly in front of the camera lens and thereby, if this water is under a slightly greater pressure than the ambient water, displaces the dirty or turbid water that is in the interior of the housing. Depending upon the size of the housing, varying distances to the object that is to be observed can be assumed underwater, with the lateral width of the housing opening in conjunction with the selected camera lens also being a measure for the surface of the object that can be observed.

In principle, the housing itself can have any desired and suitable shape. However, it has been shown to be advantageous for the housing to have an essentially frusto-conical or frusto-pyramidal shape, with the housing opening that is directed toward the object that is to be observed being disposed at the base of the cone or pyramid. Both of these two types of configuration of the housing can be manufactured in a relatively easy manner, whereby by selecting one of these shapes and a suitably large angle between the side surfaces of the housing and the imaginary axis of the housing that extends through the housing from one opening thereof to the other opening thereof, an adequately large surface can be directed at the object that is to be observed.

To keep the supply of water into the interior of the housing as small as possible while being able to fully achieve the aforementioned advantageous effects, it is advantageous to cover the housing opening that is directed toward the object that is to be observed by a light-transmitting, sheetlike element that essentially closes off this opening. Gaps are advantageously left in the edge region between the sheetlike element and the interior wall of the housing; the clean water can escape from the interior of the housing through these gaps. In this way, a remixing of the clean water with the surrounding water is avoided, since, due to the fact that the clean water has a somewhat greater inner pressure within the housing, the surrounding or ambient water cannot reenter the interior of the housing through the narrow passages at the edge of the sheetlike element.

Pursuant to another advantageous specific embodiment of the inventive apparatus, at least the peripheral zone of the element is provided with a plurality of holes, with the element otherwise being received in the housing opening in a sealing manner. In the same way as described above, the clean water can now escape out of the interior of the housing through the holes. With this type of construction, the amount of clean water required to ensure satisfactorily sharp pictures can possibly be reduced even further. It is also possible to provide the entire surface of the element with holes, or to distribute holes over certain portions thereof, in order to enable a rapid discharge of the water that is located in the interior of the housing. That opening that is provided for accommodating the camera and is disposed across from the housing opening that is directed toward the object that is to be observed is advantageously delimited by a cylindrical tube; in other words, the tube is placed upon the housing at the opening that is there provided. The cylindrical configuration of the tube, which to a certain extent extends the housing, is very expedient for the reason that the tube opening that is remote from the housing has a circular cross-section and thus offers a straightforward possibility for securing or mounting the camera, i.e. the camera lens, on the apparatus. A further advantage is that due to the presence of this tube, a rapid accommodation of different camera types or lenses of different cameras is possible merely by using a suitable adaptor.

In principle, the inlet means for the supply of clean water into the interior of the housing can be provided at any suitable location of the housing. However, from a standpoint of being able to empty the interior of a housing of dirty or turbid water as rapidly as possibly while taking in situ pictures, it has proven to be advantageous to dispose the inlet means in the tube, and in particular essentially on a lower portion thereof; in other words, the actual housing itself is rapidly emptied of dirty or turbid water by this selection of the disposition of the inlet means.

As indicated, a camera holder can preferably be introduced into the opening that is provided for accommodating the camera in such a way that the camera holder sealingly engages an inner wall of the tube, with the camera itself being adapted to be mounted in the camera holder. Thus, it would be possible to already connect the camera with the camera holder prior to insertion into the water, whereupon it is then merely necessary to introduce the interconnected camera and camera holder into the tube, where the camera holder is received in a sealing manner.

The camera holder advantageously includes an essentially cylindrical tube into which can be accommodated and mounted at least the lens region of the camera.

The seal between the camera holder and the inner wall of the tube is advantageously effected by an O-ring accommodated in a groove formed in a ring that surrounds the camera holder. In principle, in addition to the advantageous configuration of the seal as an O-ring, other advantageous seals are also possible, for example seals having one or more sealing lips.

In order to be able to illuminate the object that is being observed during the taking of in situ pictures in water, it is possible in principle to effect illumination from the outside. However, this requires that a minimal spacing from the object that is to be observed be maintained so that the light can pass the side of the apparatus and illuminate the object. It is also possible, if for example the outside of the housing is made of a light-transmitting material, to illuminate the object through the housing. However, it is advantageous to dispose at least one illumination means in the interior of the housing in order to be able to suitably illuminate the object directly from the interior of the housing.

In this connection, it is advantageous to dispose the illumination means directly on the inner wall of the housing, whereby it can also be advantageous and expedient to make the illumination means rotatable and/or pivotable from the outside in order to change the aim thereof relative to the object that is to be observed, thereby making it possible to optimally illuminate the object.

Finally, in order to facilitate manipulation and handling of the apparatus in conjunction with the camera while undertaking the in situ picture-taking in the water, it is advantageous to provide the housing with a handle means, so that it is thereby possible to dispense with having to directly hold the camera itself, since by means of this handle means the apparatus, and hence the camera that is connected to the apparatus in the aforementioned manner, can be held and manipulated.

Further specific features of the present invention will be described in detail subsequently.

DESCRIPTION OF PREFERRED EMBODIMENTS

Referring now to the drawings in detail, the apparatus 10 essentially comprises a housing 11, which in the illustrated embodiment has the shape of a truncated pyramid, i.e. is frusto-pyramidal. The housing 11 has a first opening 14 that is directed toward its base or bottom 17, and a second opening 15 that is disposed across from or opposite the opening 14. Placed upon or over the opening 15 is a cylindrical tube 19 that is secured to the housing 11 in a sealed manner in any suitable way.

Figure 3A:
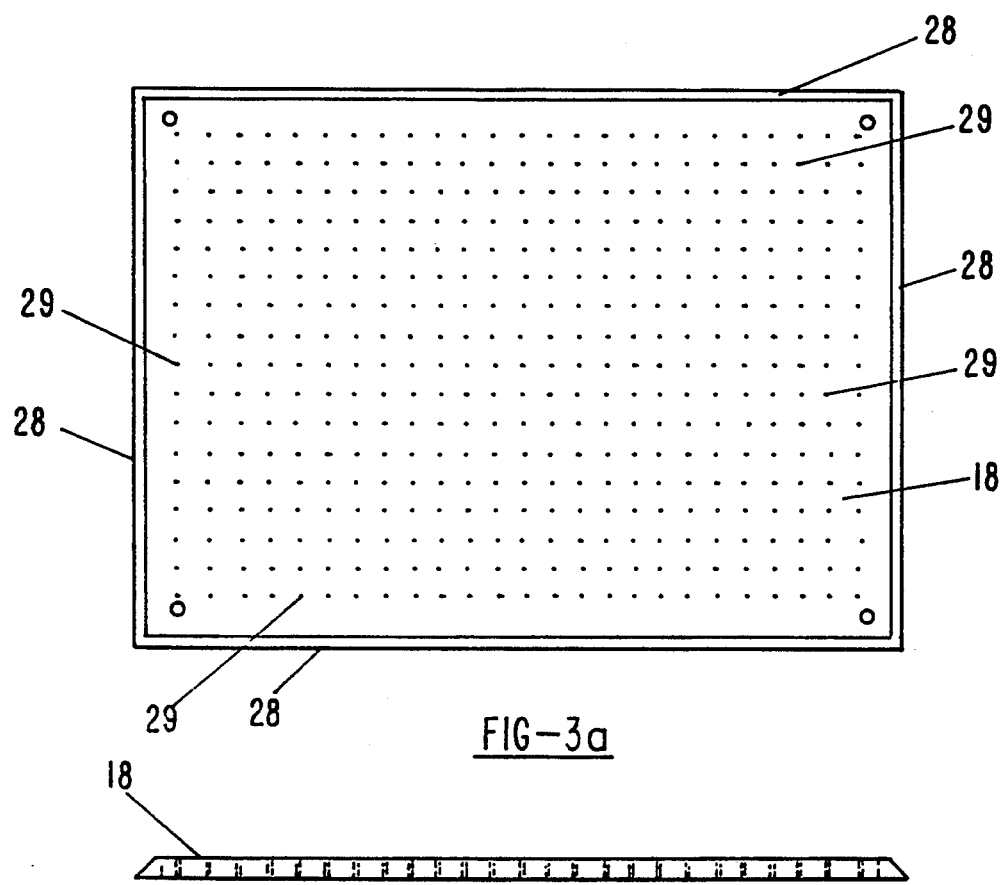
FIG. 3a is a plan view of the sheet-like element with holes provided in the peripheral zone thereof.
Figure 3B:
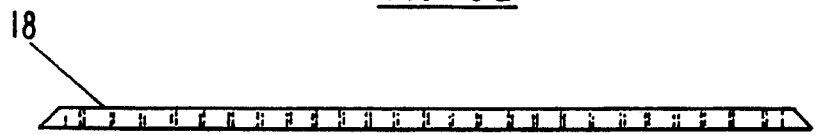
Figure 4:
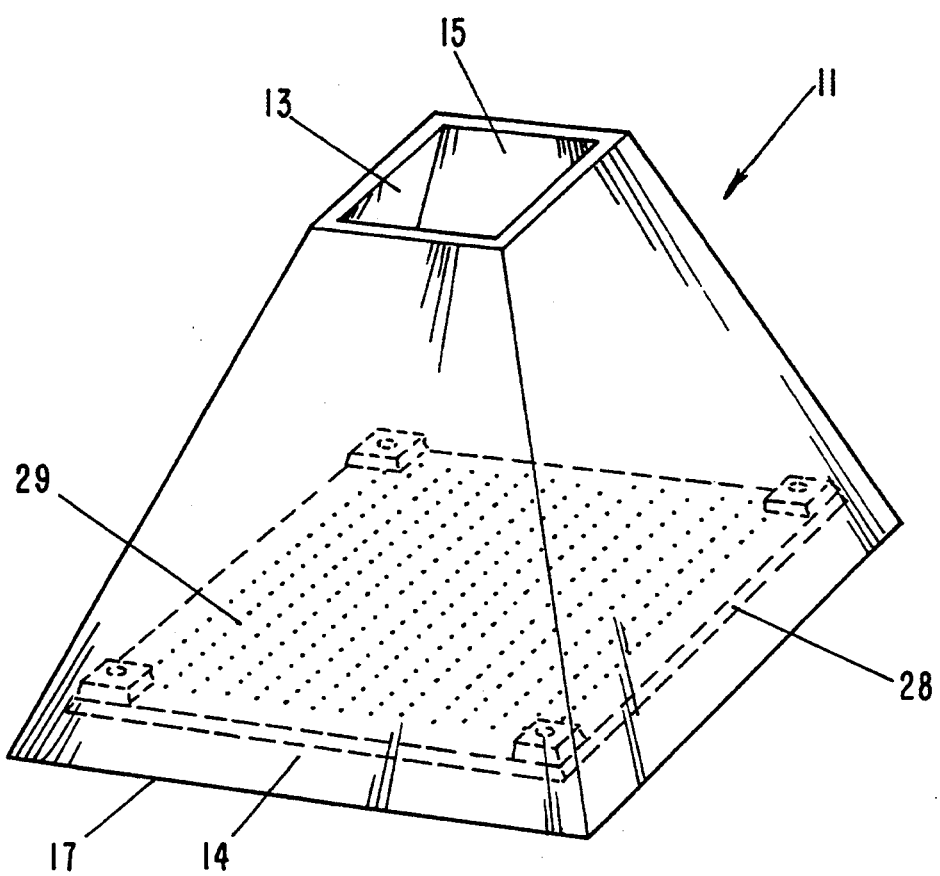
FIG. 4 is a perspective view of just the housing, with the element of FIGS. 3a and 3b disposed in the opening of the housing.

As can be seen in particular from FIGS. 3a, 3b and 4, the housing opening 14 is closed off by a light-transmitting, sheetlike element 18 in such a way that in the edge regions between the inner wall 13 of the housing 11 and the edges of the light-transmitting, sheetlike element 18 a slight gap is formed, or that the light-transmitting, sheetlike element 18 hermetically closes off the housing opening 14, in which case the peripheral zone 28 of the element 18 is then provided with a plurality of holes 29.

An inlet 16 is provided in the lower portion of the tube 19; the inlet 16 is connected to a tubular connector 160. By means of a non-illustrated hose or similar conduit, the tubular connector 160 is connected to a supply of clean water that can be disposed either in the water at the pertaining location or higher up on a platform or on a boat.

Figure 6:
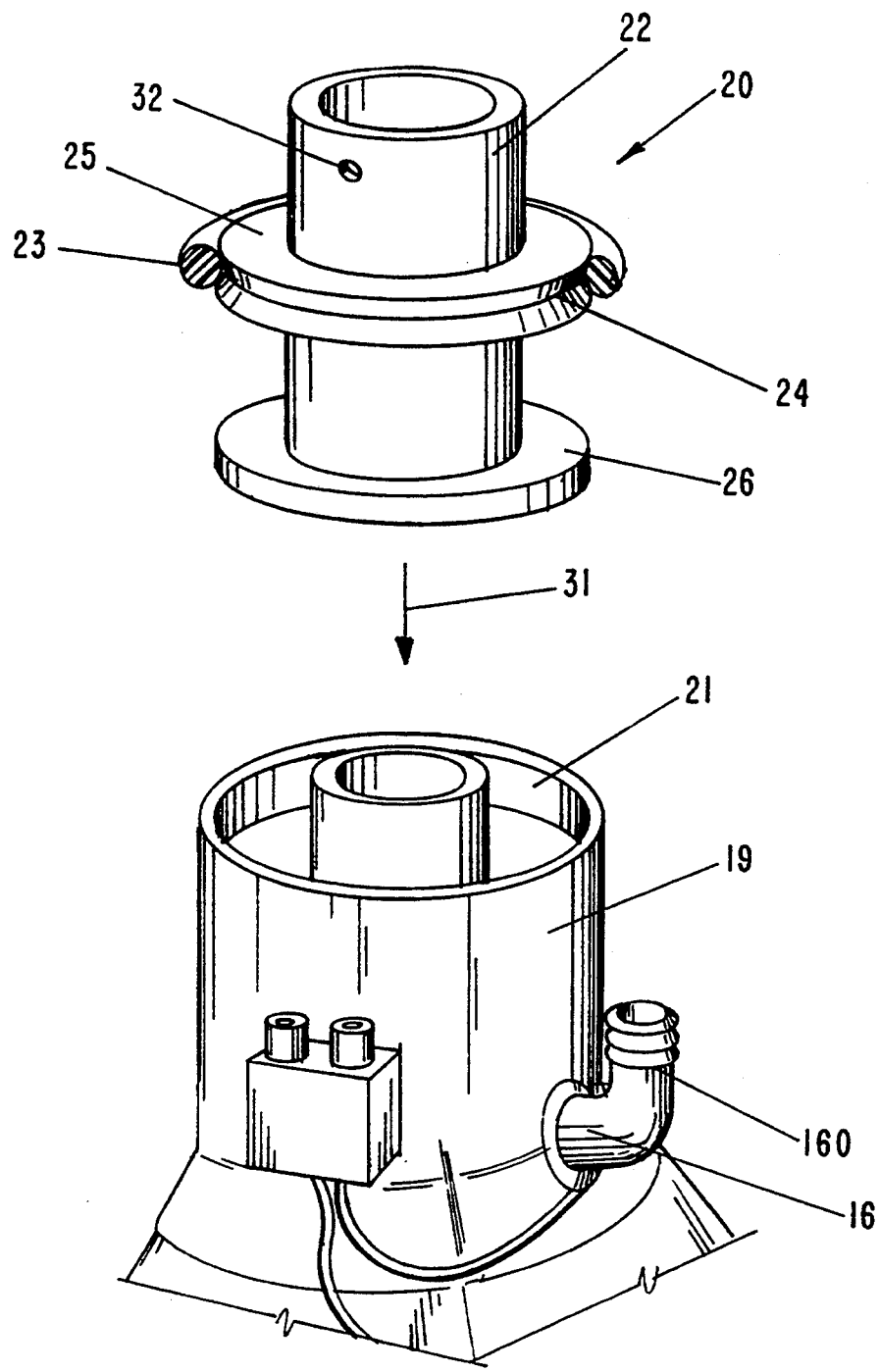
FIG. 6 shows a camera holder and tube of the top portion of the apparatus of FIG. 1, and shows how the camera holder can be introduced into the tube.

With the embodiment of the apparatus 10 illustrated in the drawings, the opening 15 is constructed for accommodating the camera itself through the upper opening 15 in the tube 19, since the actual housing 11 and the tube 19 so to speak form the entire housing. As can be seen particularly clearly from FIG. 6, a camera holder 20 can be introduced into the opening 15. The camera holder 20 essentially comprises a cylindrical tube 22 is light-transmitting cover 26 that closes off the lower end of the tube 22, and a ring 25 that extends around the camera holder 20. The ring 25 has a circumferential groove 24 into which can be introduced and in which can be accommodated a circumferential seal, for example in the form of an O-ring 23. However, it is also possible to use any other suitable sealing elements in place of the O-ring 23. The tube 22 serves for the actual accommodation of the camera, or at least of the lens portion of the camera. When a camera is introduced into the tube 22, the pertaining portion of the camera that has been introduced can be secured to the tube 22 by mounting means as schematically illustrated by the reference numeral 32.

Figure 2:
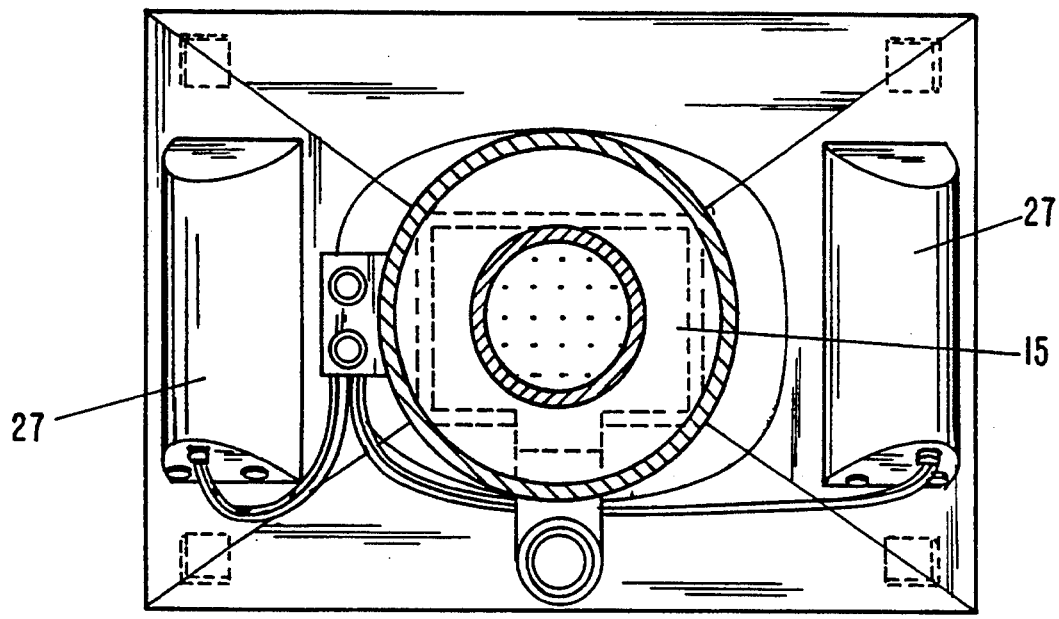
FIG. 2 is a plan and partially sectioned view of the apparatus of FIG. 1.
Figure 5:
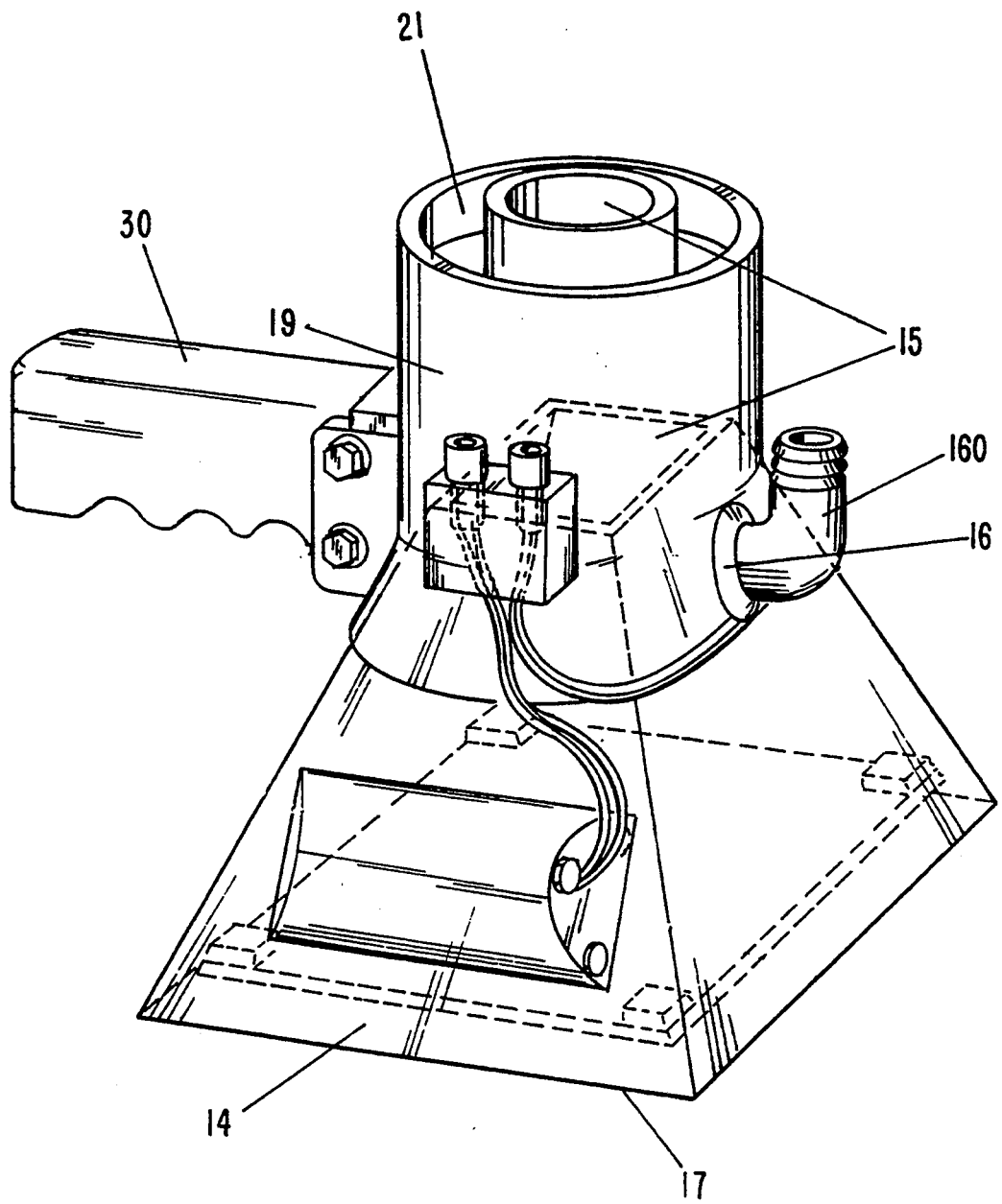
FIG. 5 is a perspective view of the apparatus of FIG. 1 with a handle means.

As can be seen from the drawings, and in particular FIG. 2, two illumination means 27 are disposed in the interior 12 of the housing 11 on the inner wall 13 of the housing. The illumination means 27 can be connected to a power source via non-illustrated connecting means such as electrical cables. The illumination means 27 can be mounted on the inner wall 13 of the housing 11, i.e. in the interior 12 of the housing, in such a way that the direction of aim thereof can be adjusted from outside of the apparatus 10 in order to permit an optimum illumination of the object that is to be observed. As shown in FIG. 5, the housing 11 can furthermore be provided with a handle means 30 so that via the apparatus 10, i.e. via the housing 11, the non-illustrated camera that is connected to the apparatus 10 can be manipulated with one hand.

In order for the apparatus 10 to function as designed, the camera, by means of the camera holder 20, is introduced into the interior of the tube 19 in the direction of the arrow 31 (FIG. 6), whereby the camera holder 20 rests in a sealing manner against the inner wall 21 of the tube 19. Subsequently, after the apparatus 10 and the camera have been placed in the water at the appropriate spot, clean water is supplied via a tubular conduit and the tubular connector 160, with this clean water having a slightly greater pressure than the ambient pressure of the dirty or turbid water. As a result, the dirty or turbid water that is in the interior 12 of the housing 11 is gradually removed from the housing interior 12 by escaping to the outside either through the holes 29 or through the aforementioned narrow gap. After a short period of time, the entire interior 12 of the housing 11 is freed of dirty or turbid water, and the apparatus 10 can be brought to the immediate vicinity of the object that is to be observed or can be placed directly upon the object, i.e. can be brought into contact with the object. The illumination means 27 illuminate the object in an optimum manner, and the picture-taking process (photographs, motion pictures, videos) can be carried out.

Excellent pictures, such as have never before been possible, have been achieved by using the inventive apparatus 10 in tide water regions, and also in lakes and oceans.

The present invention is, of course, in no way restricted to the specific disclosure of the specification and drawings, but also encompasses any modifications within the scope of the appended claims.

What I claim is:

1. An apparatus for cameras permitting the taking of in situ pictures in water, comprising:
   a housing have a first opening that is at least open to light relative to an object that is to be observed, and a second opening that is disposed essentially opposite to said first opening and serves for accommodating a camera, with said first opening of said housing being capable of being placed directly against said object that is to be observed, and with said housing also being provided with an inlet means for receiving water;
   a cylindrical tube that is disposed on said housing and forms said second opening thereof, wherein said inlet means of said housing is essentially disposed on a lower portion of said cylindrical tube; and
   a light-transmitting, sheetlike element that at least substantially closes off said first opening of said housing, wherein at least a peripheral zone of said sheetlike element is provided with aperture means.

2. An apparatus according to claim 1, wherein said housing has an essentially frusto-conical or frusto-pyramidal shape, with said first opening of said housing being disposed at a base of said housing.

3. An apparatus according to claim 1, which includes a camera holder that is adapted to be accommodated in said second opening such that said camera holder sealingly engages an inner wall of said tube.

4. An apparatus according to claim 3, wherein said camera holder includes a further essentially cylindrical tube for accommodating at least a lens portion of a camera.

5. An apparatus according to claim 4, which includes a ring that surrounds said further essentially cylindrical tube of said camera holder, with said ring being provided with a groove that accommodates an O-ring for elf acting said sealing engagement between said camera holder and said inner wall of first-mentioned said tube.

6. An apparatus according to claim 3, wherein at least one illumination means is disposed in an interior of said housing.

7. An apparatus according to claim 6, wherein said illumination means is disposed directly on an inner wall of said housing.

8. An apparatus according to claim 6, wherein a handle means is disposed on said housing.

9. An apparatus according to claim 1, wherein said aperture means comprises gaps between said sheetlike element and an interior wall of said housing.

10. An apparatus according to claim 1, wherein said aperture means comprises a plurality of holes in said sheetlike element.

11. An apparatus for cameras permitting the taking of in situ pictures in water, comprising:
   a housing have a first opening that is at least open to light relative to an object that is to be observed, and a second opening that is disposed essentially opposite to said first opening and serves for accommodating a camera, with said first opening of said housing being capable of being placed directly against said object that is to be observed, and with said housing also being provided with an inlet means for receiving water;
   a cylindrical tube that is disposed on said housing and forms said second opening thereof;
   a camera holder that is adapted to be accommodated in said second opening such that said camera holder sealingly engages an inner wall of said cylindrical tube, wherein said camera holder includes a further essentially cylindrical tube for accommodating at least a lens portion of a camera; and
   a light-transmitting, sheetlike element that at least substantially closes off said first opening of said housing, wherein at least a peripheral zone of said sheetlike element is provided with aperture means.

12. An apparatus according to claim 6, wherein said inlet means of said housing is essentially disposed on a lower portion of said cylindrical tube.

13. An apparatus according to claim 11, which includes a ring that surrounds said further essentially cylindrical tube of said camera holder, with said ring being provided with a groove that accommodates an O-ring for affecting said sealing engagement between said camera holder and said inner wall of said first-mentioned tube.

14. An apparatus according to claim 11, wherein at least one illumination means is disposed in an interior of said housing.

15. An apparatus according to claim 14, wherein said illumination means is disposed directly on an inner wall of said housing.

16. An apparatus according to claim 14, wherein a handle means is disposed on said housing.

17. An apparatus according to claim 11, wherein said aperture means comprises gaps between said sheetlike element and an interior wall of said housing.

18. An apparatus according to claim 11, wherein said aperture means comprises a plurality of holes in said sheetlike element.

19. An apparatus according to claim 11, wherein said housing has an essentially frusto-conical or frusto-pyramidal shape, with said first opening of said housing being disposed at a base of said housing.

* * * * *